United States Patent
Agarwal et al.

(10) Patent No.: US 7,523,087 B1
(45) Date of Patent: Apr. 21, 2009

(54) DETERMINING AND/OR DESIGNATING BETTER AD INFORMATION SUCH AS AD LANDING PAGES

(75) Inventors: Sumit Agarwal, San Carlos, CA (US); Salar Arta Kamangar, Palo Alto, CA (US)

(73) Assignee: Google, Inc., Mountain View, CA (US)

( * ) Notice: Subject to any disclaimer, the term of this patent is extended or adjusted under 35 U.S.C. 154(b) by 401 days.

(21) Appl. No.: 10/750,365

(22) Filed: Dec. 31, 2003

(51) Int. Cl.
*G06F 17/30* (2006.01)

(52) U.S. Cl. .............................. 707/1; 705/10; 707/100
(58) Field of Classification Search .................... 707/10, 707/102, 104.1, 1, 100; 725/42; 705/26, 705/10
See application file for complete search history.

(56) References Cited

U.S. PATENT DOCUMENTS

| | | | |
|---|---|---|---|
| 5,754,939 A * | 5/1998 | Herz et al. ................. | 455/3.04 |
| 5,948,061 A * | 9/1999 | Merriman et al. ........... | 709/219 |
| 6,876,997 B1 * | 4/2005 | Rorex et al. ..................... | 707/3 |
| 7,031,932 B1 * | 4/2006 | Lipsky et al. ................. | 705/14 |
| 7,047,242 B1 * | 5/2006 | Ponte .......................... | 707/10 |
| 7,130,808 B1 | 10/2006 | Ranka et al. .................. | 705/10 |
| 7,406,434 B1 | 7/2008 | Chang et al. ................. | 705/10 |
| 2001/0037283 A1 * | 11/2001 | Mullaney ...................... | 705/37 |
| 2003/0014539 A1 * | 1/2003 | Reznick ....................... | 709/238 |
| 2004/0044566 A1 * | 3/2004 | Bostelmann et al. .......... | 705/14 |
| 2004/0083133 A1 * | 4/2004 | Nicholas et al. ............... | 705/14 |
| 2004/0093327 A1 * | 5/2004 | Anderson et al. .............. | 707/3 |
| 2004/0103024 A1 * | 5/2004 | Patel et al. ..................... | 705/14 |
| 2004/0267612 A1 * | 12/2004 | Veach .......................... | 705/14 |
| 2005/0050097 A1 * | 3/2005 | Yeh et al. .................. | 707/104.1 |
| 2005/0055271 A1 * | 3/2005 | Axe et al. ...................... | 705/14 |
| 2005/0065806 A1 * | 3/2005 | Harik ............................. | 705/1 |
| 2005/0076014 A1 * | 4/2005 | Agarwal et al. ................ | 707/3 |
| 2005/0114198 A1 * | 5/2005 | Koningstein et al. .......... | 705/10 |

* cited by examiner

*Primary Examiner*—Cheryl Lewis
(74) *Attorney, Agent, or Firm*—Straub and Pokotylo; John C. Pokotylo

(57) ABSTRACT

The performance (e.g., in terms of selection rates, conversion rates, revenues, profits, etc.) of different ad landing pages may be evaluated and compared by (i) for a given ad or collection of ads, serving the ad with the different ad landing pages (e.g., by rotating through the ad landing pages), and (ii) collecting per ad landing page performance information. An authorized user may be provided with such per ad landing page performance information and may designated one of the ad landing pages to be used in future serves of the ad. An authorized application program may be provided with such ad landing pages performance information and may designate one of the ad landing pages to be used in further serves of the ad using such information.

37 Claims, 6 Drawing Sheets

DETERMINING AND/OR DESIGNATING BETTER AD INFORMATION SUCH AS AD LANDING PAGES

§ 1. BACKGROUND OF THE INVENTION

§ 1. Field of the Invention

The present invention concerns advertising. In particular, the present invention concerns improving the performance of ads, such as in terms of clickthroughs or conversions.

§ 1.2. Background Information

Advertising using traditional media, such as television, radio, newspapers and magazines, is well known. Unfortunately, even when armed with demographic studies and entirely reasonable assumptions about the typical audience of various media outlets, advertisers recognize that much of their ad budget is simply wasted. Moreover, it is very difficult to identify and eliminate such waste.

Recently, advertising over more interactive media has become popular. For example, as the number of people using the Internet has exploded, advertisers have come to appreciate media and services offered over the Internet as a potentially powerful way to advertise.

Advertisers have developed several strategies in an attempt to maximize the value of such advertising. In one strategy, advertisers use popular presences or means for providing interactive media or services (referred to as "Websites" in the specification without loss of generality) as conduits to reach a large audience. Using this first approach, an advertiser may place ads on the home page of the New York Times Website, or the USA Today Website, for example. In another strategy, an advertiser may attempt to target its ads to narrower niche audiences, thereby increasing the likelihood of a positive response by the audience. For example, an agency promoting tourism in the Costa Rican rainforest might place ads on the ecotourism-travel subdirectory of the Yahoo Website. An advertiser will normally determine such targeting manually.

Regardless of the strategy, Website-based ads (also referred to as "Web ads") are typically presented to their advertising audience in the form of "banner ads"—i.e., a rectangular box that includes graphic components. When a member of the advertising audience (referred to as a "viewer" or "user" in the specification without loss of generality) selects one of these banner ads by clicking on it, embedded hypertext links typically direct the viewer to a page on the advertiser's Website (referred to as an "ad landing page" or simply a "landing page"). This process, wherein the viewer selects an ad, is commonly referred to as a "click-through" ("Click-through" is intended to cover any user selection.). The ratio of the number of click-throughs to the number of impressions of the ad (i.e., the number of times an ad is rendered) is commonly referred to as the "click-through rate" of the ad.

A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's web page, and consummates a purchase there before leaving that Web page. Alternatively, a conversion may be defined as a user being shown an ad, and making a purchase on the advertiser's Web page within a predetermined time (e.g., seven days). In yet another alternative, a conversion may be defined by an advertiser to be any measurable/observable user action such as, for example, downloading a white paper, navigating to at least a given depth of a Website, viewing at least a certain number of Web pages, spending at least a predetermined amount of time on a Website or Web page, registering on a Website, etc. Often, if user actions don't indicate a consummated purchase, they may indicate a sales lead, although user actions constituting a conversion are not limited to this. Indeed, many other definitions of what constitutes a conversion are possible. The ratio of the number of conversions to the number of impressions of the ad (i.e., the number of times an ad is displayed) is commonly referred to as the conversion rate. If a conversion is defined to be able to occur within a predetermined time since the serving of an ad, one possible definition of the conversion rate might only consider ads that have been served more than the predetermined time in the past.

Despite the initial promise of Website-based advertisement, challenges remain. Although advertisers are able to reach a large audience, they may be dissatisfied with the return on their advertisement investment.

Similarly, the hosts of Websites on which the ads are presented (referred to as "Website hosts" or "ad consumers") have the challenge of maximizing ad revenue without impairing their users' experience. Some Website hosts have chosen to place advertising revenues over the interests of users. One Website hosts a service returning advertisements as "search results" in response to user queries. The Overture.com Website permits advertisers to pay to position an ad for their Website (or a target Website) higher up on the list of purported search results. If such schemes where the advertiser only pays if a user clicks on the ad (i.e., cost-per-click) are implemented, the advertiser lacks incentive to target their ads effectively, since a poorly targeted ad will not be clicked and therefore will not require payment. Consequently, high cost-per-click ads show up near or at the top, but do not necessarily translate into real revenue for the ad publisher because viewers don't click on them. Furthermore, ads that viewers would click on are further down the list, or not on the list at all, and so relevancy of ads is compromised.

Search engines, such as Google for example, have enabled advertisers to target their ads so that they will be rendered with a search results page and so that they will be relevant, presumably, to the query that prompted the search results page. Other targeted advertising systems, such as those that target ads based on e-mail information (See, e.g., the systems described in U.S. patent application Ser. No. 10/452,830 (incorporated herein by reference), titled "SERVING ADVERTISEMENTS USING INFORMATION ASSOCIATED WITH E-MAIL," filed on Jun. 2, 2003 and listing Jeffrey A. Dean, Georges R. Harik and Paul Bucheit as inventors.), or those that target ads based on content (See, e.g., U.S. patent application Ser. No. 10/375,900 U.S. Pat. No. 7,136,875, (incorporated herein by reference), titled "SERVING ADVERTISEMENTS BASED ON CONTENT," filed on Feb. 26, 2003 and listing Darrell Anderson, Paul Bucheit, Alex Carobus, Claire Cui, Jeffrey A. Dean, Georges R. Harik, Deepak Jindal, and Narayanan Shivakumar as inventors.) may have similar challenges. That is, advertising systems would like to present advertisements that are relevant to the user requested information in general, and related to the current user interest in particular.

As can be appreciated from the foregoing, targeted advertising systems, such as keyword-targeted advertising or content-targeted advertising provide very useful forms of advertising. With such ad serving systems, as well as other online advertising systems, enticing users to select ads so that they will be brought to a document (such as a Web page, commonly referred to as a "landing page" of the ad) with marketing information and where they can consummate a transaction is one goal of the advertiser. The advertisers would also like the user to consummate or initiate a transaction, or at least influence a possible future transaction. Whether or not a user will select an ad may be a function of ad information, such as ad features, as well as serving constraints that were used to target the serving of the ad. Whether or not a user will consummate or initiate a transaction, or at least be influenced in a possible future transaction may in large part be a function of the landing page.

In view of the foregoing, there is a need for methods and apparatus for improving the performance (e.g., in terms of clickthrough rates, conversion rates, conversion amounts, conversion profits, etc.) of ads and ad information constituting or associated with ads such as landing pages for example.

§ 2. SUMMARY OF THE INVENTION

The present invention helps ad serving entities and/or advertisers to improve the performance of ad landing pages. The present invention may do so by (i) providing or accepting different landing pages for a given ad, (ii) selecting different ones of the different landing pages to be used when an ad is served, and (iii) tracking the performance of the different landing pages. In this way, both an ad serving entity and advertisers can determine which of a number of different ad landing pages perform best (in general, or in the context of particular targeting criteria and/or ad creatives). Using the performance of the different ad landing pages, the advertiser or ad serving entity can manually or automatically designate one (or more) of the ad landing pages (e.g., to be used with future serves of the ad). At least one embodiment of the present invention may be used to improve how pieces of ad information, such as ad features and/or serving constraints used to trigger an ad, are combined.

§ 3. BRIEF DESCRIPTION OF THE DRAWINGS

§ 4. DETAILED DESCRIPTION

The present invention may involve novel methods, apparatus, message formats and/or data structures for comparing ad landing pages, and possibly designating one or more of the ad landing pages using results of the comparison. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventor regards his invention as any patentable subject matter described.

In the following, environments in which, or with which, the present invention may operate are described in § 4.1. Then, exemplary embodiments of the present invention are described in § 4.2. Finally, some conclusions regarding the present invention are set forth in § 4.3.

§ 4.1 ENVIRONMENTS IN WHICH, OR WITH WHICH, THE PRESENT INVENTION MAY OPERATE

§ 4.1.1 Exemplary Advertising Environment

Figure 1:
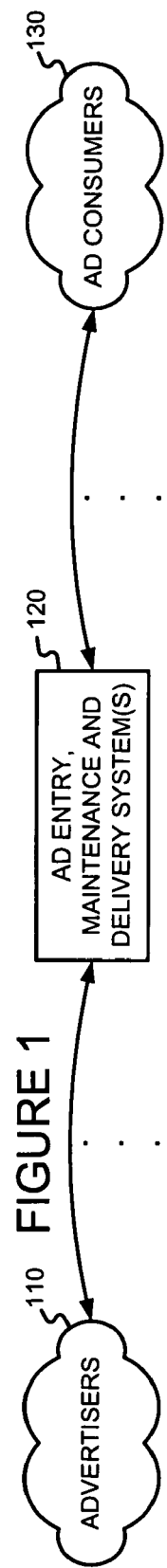
FIG. 1 is a high-level diagram showing parties or entities that can interact with an advertising system.

FIG. 1 is a high level diagram of an advertising environment. The environment may include an ad entry, maintenance and delivery system (simply referred to an ad server) 120. Advertisers 110 may directly, or indirectly, enter, maintain, and track ad information in the system 120. The ads may be in the form of graphical ads such as so-called banner ads, text only ads, image ads, audio ads, video ads, ads combining one of more of any of such components, etc. The ads may also include embedded information, such as a link, and/or machine executable instructions. Ad consumers 130 may submit requests for ads to, accept ads responsive to their request from, and provide usage information to, the system 120. An entity other than an ad consumer 130 may initiate a request for ads. Although not shown, other entities may provide usage information (e.g., whether or not a conversion or clickthrough related to the ad occurred) to the system 120. This usage information may include measured or observed user behavior related to ads that have been served.

Figure 2:
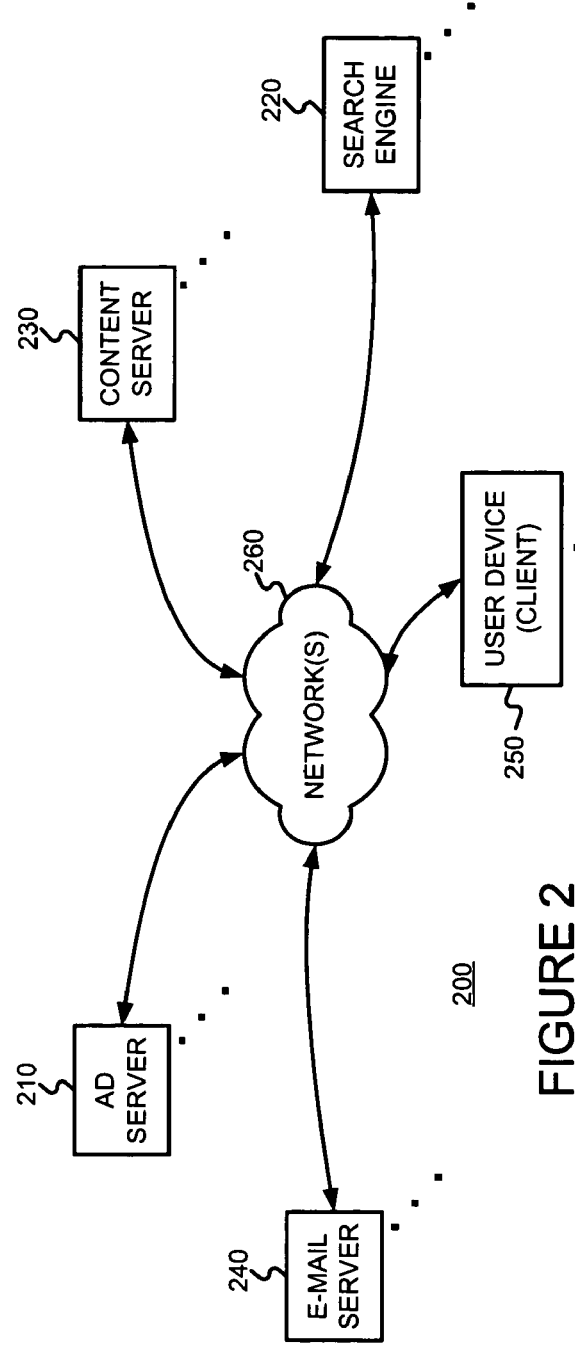
FIG. 2 illustrates an environment in which advertisers can target their ads on search results pages generated by a search engine, documents served by content servers, and/or e-mail.

FIG. 2 illustrates an environment 200 in which the present invention may be used. A user device (also referred to as a "client" or "client device") 250 may include a browser facility (such as the Opera browser, the Explorer browser from Microsoft, or the Navigator browser from AOL/Time Warner), an e-mail facility (e.g., Outlook from Microsoft), etc. A search engine 220 may permit user devices 250 to search collections of documents (e.g., Web pages). A content server 210 may permit user devices 250 to access documents. An e-mail server (e.g., Hotmail from Microsoft Network, Yahoo Mail, etc.) 240 may be used to provide e-mail functionality to user devices 250. An ad server 210 may be used to serve ads to user devices 250. The ads may be served in association with search results provided by the search engine 220, content provided by the content server 230, and/or e-mail supported by the e-mail server 240 and/or user device e-mail facilities.

Thus, one example of an ad consumer 130 is a general content server 230 that receives requests for documents (e.g., articles, discussion threads, music, video, graphics, search results, Web page listings, etc.), and retrieves the requested document in response to, or otherwise services, the request. The content server may submit a request for ads to the ad server 120/210. Such an ad request may include a number of ads desired. The ad request may also include document request information. This information may include the document itself (e.g., page), a category or topic corresponding to the content of the document or the document request (e.g., arts, business, computers, arts-movies, arts-music, etc.), part or all of the document request, content age, content type (e.g., text, graphics, video, audio, mixed media, etc.), geolocation information, document information, etc.

The content server 230 may combine the requested document with one or more of the advertisements provided by the ad server 120/210. This combined information including the document content and advertisement(s) is then forwarded towards the end user device 250 that requested the document, for presentation to the user. Finally, the content server 230 may transmit information about the ads and how, when, and/or where the ads are to be rendered (e.g., position, click-through or not, impression time, impression date, size, conversion or not, etc.) back to the ad server 120/210. Alternatively, or in addition, such information may be provided back to the ad server 120/210 by some other means.

Another example of an ad consumer 130 is the search engine 220. A search engine 220 may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," *Seventh International World Wide Web Conference*, Brisbane, Australia and in U.S. Pat. No. 6,285,999 (both incorporated herein by reference). Such search results may include, for example, lists of Web page titles, snippets of text extracted from those Web pages, and hypertext links to those Web pages, and may be grouped into a predetermined number of (e.g., ten) search results.

The search engine 220 may submit a request for ads to the ad server 120/210. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as geolocation information, whether the query came from an affiliate and an identifier of such an affiliate), and/or information associated with, or based on, the search results. Such information may include, for example, identifiers related to the search results (e.g., document identifiers or "docIDs"), scores relates to the search results (e.g., information retrieval ("IR") scores such as dot products of feature vectors corresponding to a query and a document, Page Rank scores, and/or combinations of IR scores and Page Rank scores), snippets of text extracted from identified documents (e.g., Web pages), full text of identified documents, topics of identified documents, feature vectors of identified documents, etc.

The search engine 220 may combine the search results with one or more of the advertisements provided by the ad server 120/210. This combined information including the search results and advertisement(s) is then forwarded towards the user that submitted the search, for presentation to the user. Preferably, the search results are maintained as distinct from the ads, so as not to confuse the user between paid advertisements and presumably neutral search results.

Finally, the search engine 220 may transmit information about the ad and when, where, and/or how the ad was to be rendered (e.g., position, click-through or not, impression time, impression date, size, conversion or not, etc.) back to the ad server 120/210. Alternatively, or in addition, such information may be provided back to the ad server 120/210 by some other means.

As discussed in U.S. patent application Ser. No. 10/375,900 introduced in § 1.2 above, ads targeted to documents served by content servers may also be served.

Finally, as discussed in U.S. patent application Ser. No. 10/452,830 introduced in § 1.2 above, the e-mail server 240 may be thought of, generally, as a content server in which a document served is simply an e-mail. Further, e-mail applications (such as Microsoft Outlook for example) may be used to send and/or receive e-mail. Therefore, an e-mail server 240 or application may be thought of as an ad consumer 130. Thus, e-mails may be thought of as documents, and targeted ads may be served in association with such documents. For example, one or more ads may be served in, under, over, or otherwise in association with an e-mail.

§ 4.1.2 Exemplary Ad Entry, Maintenance and Delivery Environment

Figure 3:
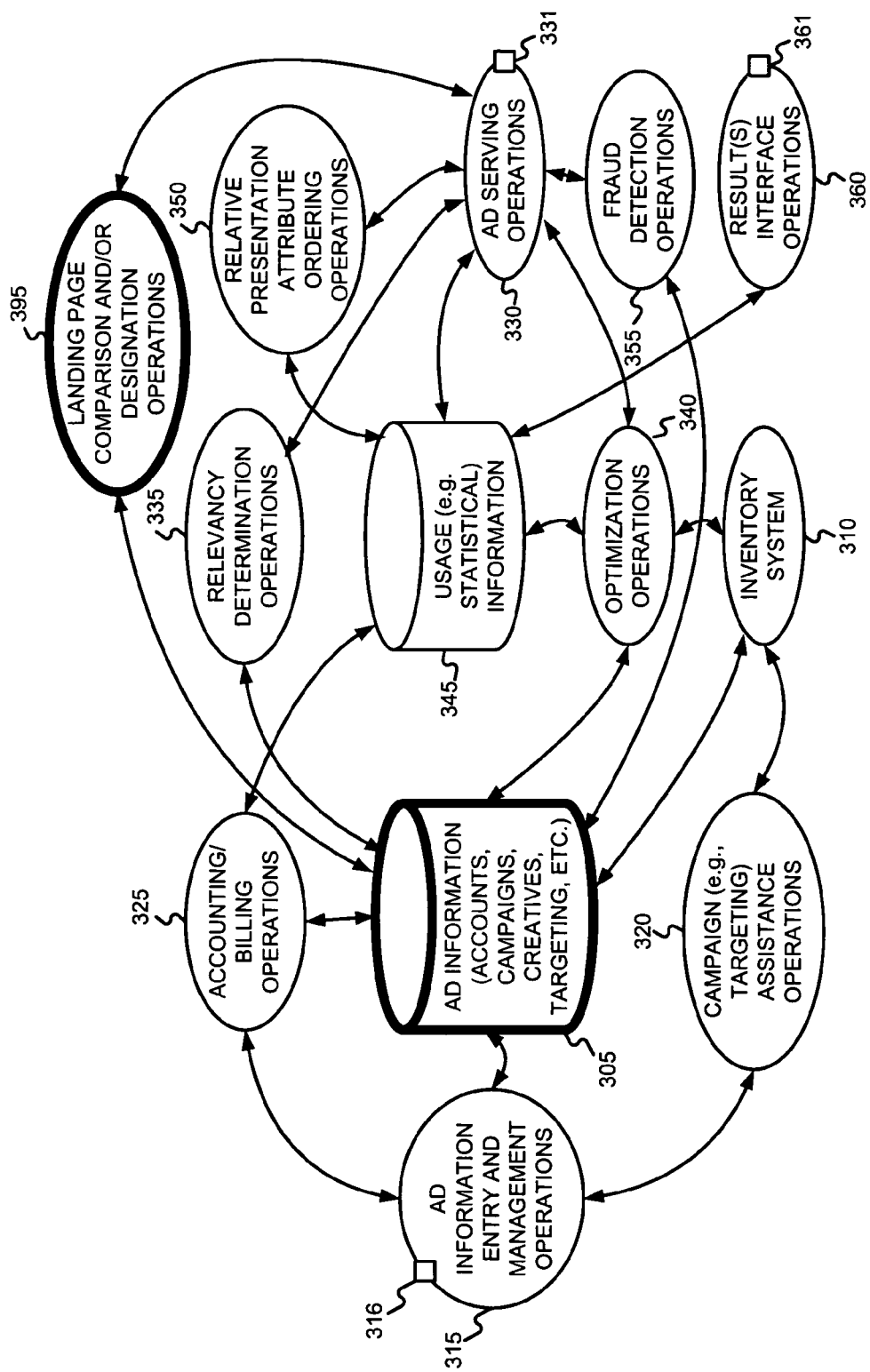
FIGS. 3 and 4 are bubble diagrams of operations that may be performed in ad serving systems, and how the present invention may be used with such operations.

FIG. 3 illustrates an exemplary ad system 120', consistent with the present invention. The exemplary ad system 120' may include an inventory system 310 and may store ad information 305 and usage information 345. The exemplary system 120' may support ad information entry and management operations 315, campaign (e.g., targeting) assistance operations 320, accounting and billing operations 325, ad serving operations 330, relevancy determination operations 335, optimization operations 340, relative presentation attribute assignment (e.g., position ordering) operations 350, fraud detection operations 355, and result interface operations 360.

Advertisers 110 may interface with the system 120' via the ad information entry and management operations 315 as indicated by interface 316. Ad consumers 130 may interface with the system 120' via the ad serving operations 330 as indicated by interface 331. Ad consumers 130 and/or other entities (not shown) may also interface with the system 120' via results interface operations 360 as indicated by interface 361.

An advertising program may include information concerning accounts, campaigns, creatives, targeting, etc. The term "account" relates to information for a given advertiser (e.g., a unique email address, a password, billing information, etc.). A "campaign" or "ad campaign" refers to one or more groups of one or more advertisements, and may include a start date, an end date, budge information, geo-targeting information, syndication information, etc. For example, Honda may have one advertising campaign for its automotive line, and a separate advertising campaign for its motorcycle line. The campaign for its automotive line may have one or more ad groups, each containing one or more ads. Each ad group may include a set of keywords, and a maximum cost bid (cost per click-though, cost per conversion, etc.). Alternatively, or in addition, each ad group may include an average cost bid (e.g., average cost per click-through, average cost per conversion, etc.). Therefore, a single maximum cost bid and/or a single average cost bid may be associated with one or more keywords. As stated, each ad group may have one or more ads or "creatives" (That is, ad content that is ultimately rendered to an end user.). Each ad or ad group may be associated with one or more landing pages. An ad may be associated with a landing page using a link, such as a hyper-text link for example, to a URL of the landing page. Alternatively, or in addition, each ad campaign may be associated with one or more sets of ad information combinations, such as combinations of ad features and/or ad serving constraints used to target the serving of the ad. Naturally, the ad information 305 may include more or less information, and may be organized in a number of different ways.

The ad information 305 can be entered and managed via the ad information entry and management operations 315. Campaign (e.g., targeting) assistance operations 320 can be employed to help advertisers 110 generate effective ad campaigns. At least some of the performance information discussed below may be provided to advertisers using such operations 315. For example, the campaign assistance operations 320 can use information provided by the inventory system 310, which, in the context of advertising for use with a search engine, may track all possible ad impressions, ad impressions already reserved, and ad impressions available for given keywords. The ad serving operations 330 may service requests for ads from ad consumers 130. The ad serving operations 330 may use relevancy determination operations 335 to determine candidate ads for a given request. The ad serving operations 330 may then use optimization operations 340 to select a final set of one or more of the candidate ads. Finally, the ad serving operations 330 may use relative presentation attribute assignment operations 350 to order the presentation of the ads to be returned. The fraud detection operations 355 can be used to reduce fraudulent use of the advertising system (e.g., by advertisers), such as through the use of stolen credit cards. Finally, the results interface operations 360 may be used to accept result information (from the ad consumers 130 or some other entity) about an ad actually served, such as whether or not click-through occurred, whether or not conversion occurred (e.g., whether the sale of an advertised item or service was initiated or consummated within a predetermined time from the rendering of the ad), etc. Such results information may be accepted at interface 361 and may include information to identify the ad and time the ad was served, as well as the associated result.

Landing page comparison and/or designation operations 395 may be used to test and compare the performance of different ad landing pages, and/or to allow one (or more) of a number of ad landing pages to be designated (e.g., to be used with future serves of the ad). In the system 120', it 395 may interact with ad serving operations 330 and ad information 305 for example. Alternatively, or in addition, operations 395 may be used to test and compare the performance of different combinations of ad information, such as combinations of ad features and/or serving constraints used to trigger the serving of ads.

Figure 4:
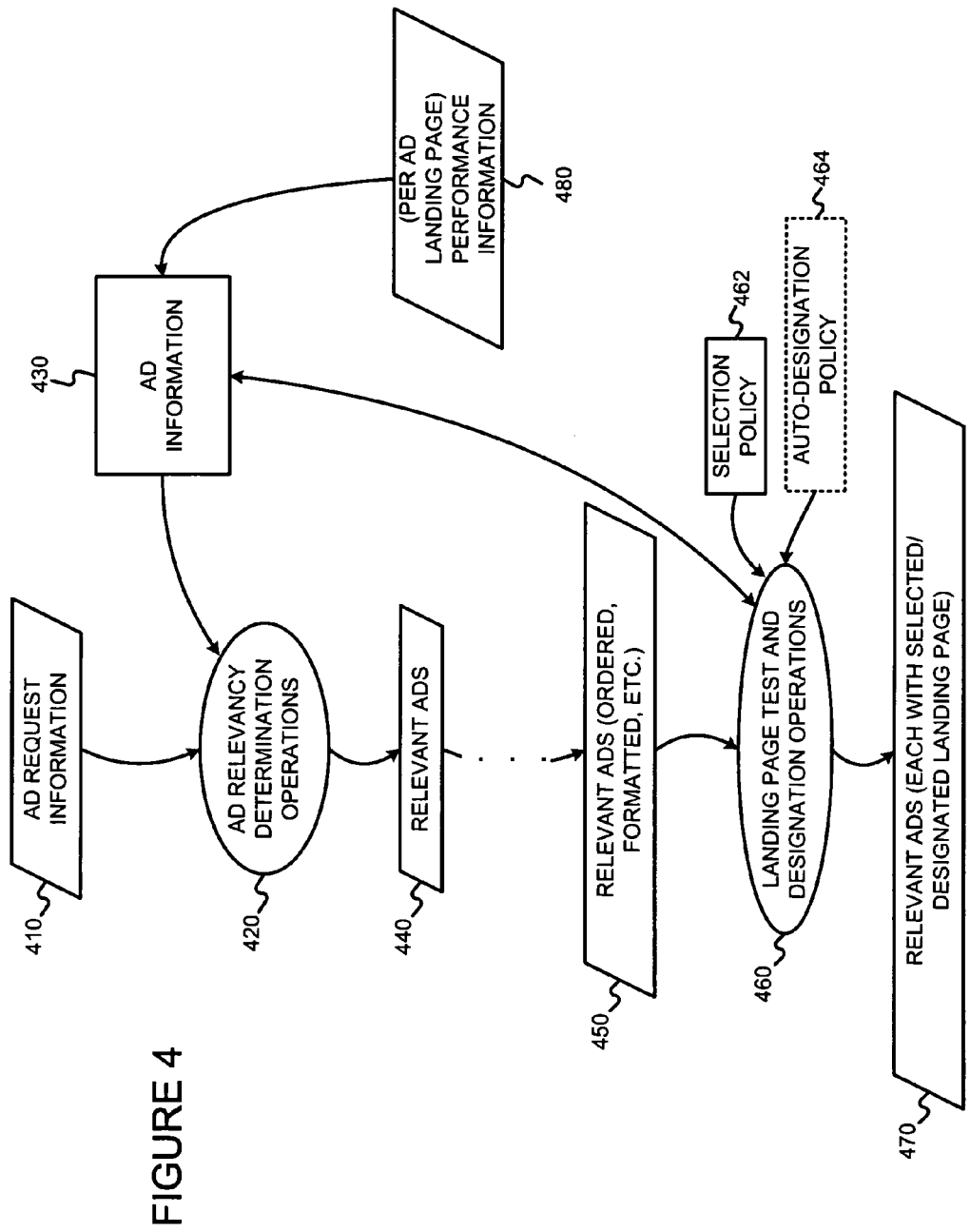

FIG. 4 is a bubble diagram illustrating operations that may be performed in ad serving systems, and how the present invention may be used with such operations. Ad relevancy determination operations 420 may determine relevant ads 440 using ad request information 410 and ad information 430. Note that (per ad landing page) ad performance information 480 may be stored as ad information 430. Further operations (not shown) may further process the relevant ads 440 to define a second set of (e.g., filtered, ordered, etc.) relevant ads 450 to be served. Ad landing page test and designation operations 460 may use ad information 430 to determine a set of relevant ads, each with a particular landing page 470. The ad landing page test and designation operations 460 may select an ad landing page for each of the ads using a selection policy 462. Further, the ad landing page test and designation operations 460 may designate one (or more) of a plurality of candidate ad landing pages for an ad using an auto-designation policy 464.

§ 4.1.3 Definitions

Online ads, such as those used in the exemplary systems described above with reference to FIGS. 1-3, or any other system, may have various intrinsic features. Such features may be specified by an application and/or an advertiser. These features are referred to as "ad features" below. For example, in the case of a text ad, ad features may include a title line, ad text, and an embedded link. In the case of an image ad, ad features may include images, executable code, and an embedded link. Depending on the type of online ad, ad features may include one or more of the following: text, a link, an audio file, a video file, an image file, executable code, embedded information, etc. Ad features may include characteristics of the foregoing, such as a text font style (e.g., font type, size, color, etc.) The embedded link may be a link to a landing page associated with the ad such that when a user selects the ad, the landing page is rendered to the user. This may be thought of as the user being "brought to" the landing page.

When an online ad is served, one or more parameters may be used to describe how, when, and/or where the ad was served. These parameters are referred to as "serving parameters" below. Serving parameters may include, for example, one or more of the following: features of (including information on) a page on which the ad was served, a search query or search results associated with the serving of the ad, a user characteristic (e.g., their geolocation, the language used by the user, the type of browser used, previous page views, previous behavior), a host or affiliate site (e.g., America Online, Google, Yahoo) that initiated the request, an absolute position of the ad on the page on which it was served, a position (spatial or temporal) of the ad relative to other ads served, an absolute size of the ad, a size of the ad relative to other ads, a color of the ad, a number of other ads served, types of other ads served, time of day served, time of week served, time of year served, etc. Naturally, there are other serving parameters that may be used in the context of the invention.

Although serving parameters may be extrinsic to ad features, they may be associated with an ad as serving conditions or constraints. When used as serving conditions or constraints, such serving parameters are referred to simply as "serving constraints" (or "targeting criteria"). For example, in some systems, an advertiser may be able to target the serving of its ad by specifying that it is only to be served on weekdays, no lower than a certain position, only to users in a certain geolocation, etc. As another example, in some systems, an advertiser may specify that its ad is to be served only if a page or search query includes certain keywords or phrases. As yet another example, in some systems, an advertiser may specify that its ad is to be served only if a document being served includes certain topics or concepts, or falls under a particular cluster or clusters, or some other classification or classifications.

"Geolocation information" may include information specifying one or more of one or more countries, one or more (inter-country) regions, one or more states, one or more metro areas, one or more cities, one or more towns, one or more boroughs, one or more areas with common zip codes, one or more areas with common telephone area codes, one or more areas served by common cable head end stations, one or more areas served by common network access points or nodes, etc. It may include latitude and/or longitude, or a range thereof. It may include information, such as an IP address, from which a user location can be estimated.

"Ad information" may include any combination of ad features, ad serving constraints, information derivable from ad features or ad serving constraints (referred to as "ad derived information"), and/or information related to the ad (referred to as "ad related information"), as well as an extension of such information (e.g., information derived from ad related information).

A "document" is to be broadly interpreted to include any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.) Ad spots in the document may be defined by embedded information or instructions. In the context of the Internet, a common document is a Web page. Web pages often include content and may include embedded information (such as meta information, hyperlinks, etc.) and/or embedded instructions (such as Javascript, etc.). In many cases, a document has a unique, addressable, storage location and can therefore be uniquely identified by this addressable location. A universal resource locator (URL) is a unique address used to access information on the Internet.

"Document information" may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

Content from a document may be rendered on a "content rendering application or device". Examples of content rendering applications include an Internet browser (e.g., Explorer or Netscape), a media player (e.g., an MP3 player, a Realnetworks streaming audio file player, etc.), a viewer (e.g., an Abobe Acrobat pdf reader), etc.

A "content owner" is a person or entity that has some property right in the content of a document. A content owner may be an author of the content. In addition, or alternatively, a content owner may have rights to reproduce the content, rights to prepare derivative works of the content, rights to display or perform the content publicly, and/or other proscribed rights in the content. Although a content server might be a content owner in the content of the documents it serves, this is not necessary.

"User information" may include user behavior information and/or user profile information.

"E-mail information" may include any information included in an e-mail (also referred to as "internal e-mail information"), information derivable from information included in the e-mail and/or information related to the e-mail, as well as extensions of such information (e.g., information derived from related information). An example of information derived from e-mail information is information extracted or otherwise derived from search results returned in response to a search query composed of terms extracted from an e-mail subject line. Examples of information related to e-mail information include e-mail information about one or more other e-mails sent by the same sender of a given e-mail, or user information about an e-mail recipient. Information derived from or related to e-mail information may be referred to as "external e-mail information."

Various exemplary embodiments of the present invention are now described in § 4.2.

§ 4.2 EXEMPLARY EMBODIMENTS

The present invention helps ad serving entities and/or advertisers to compare the performance of different ad landing pages. The present invention may do so by serving ads with at least two different landing pages, and tracking the performance of the landing pages. The present invention may also provide such determined performance information of the landing pages to advertisers and/or the ad serving entity, and allow the advertiser and/or the ad serving entity to designate one (or more) of the at least two different landing pages. Alternatively, or in addition, the best performing ad landing page(s) may be designated in accordance with some designation policy. Exemplary methods for performing these operations are described in § 4.2.1 below. Exemplary apparatus are described in § 4.2.2 below. Finally, various refinements and alternatives are described in § 4.2.3 below.

§ 4.2.1 Exemplary Methods for Comparing Ad Landing Pages

Figure 5:
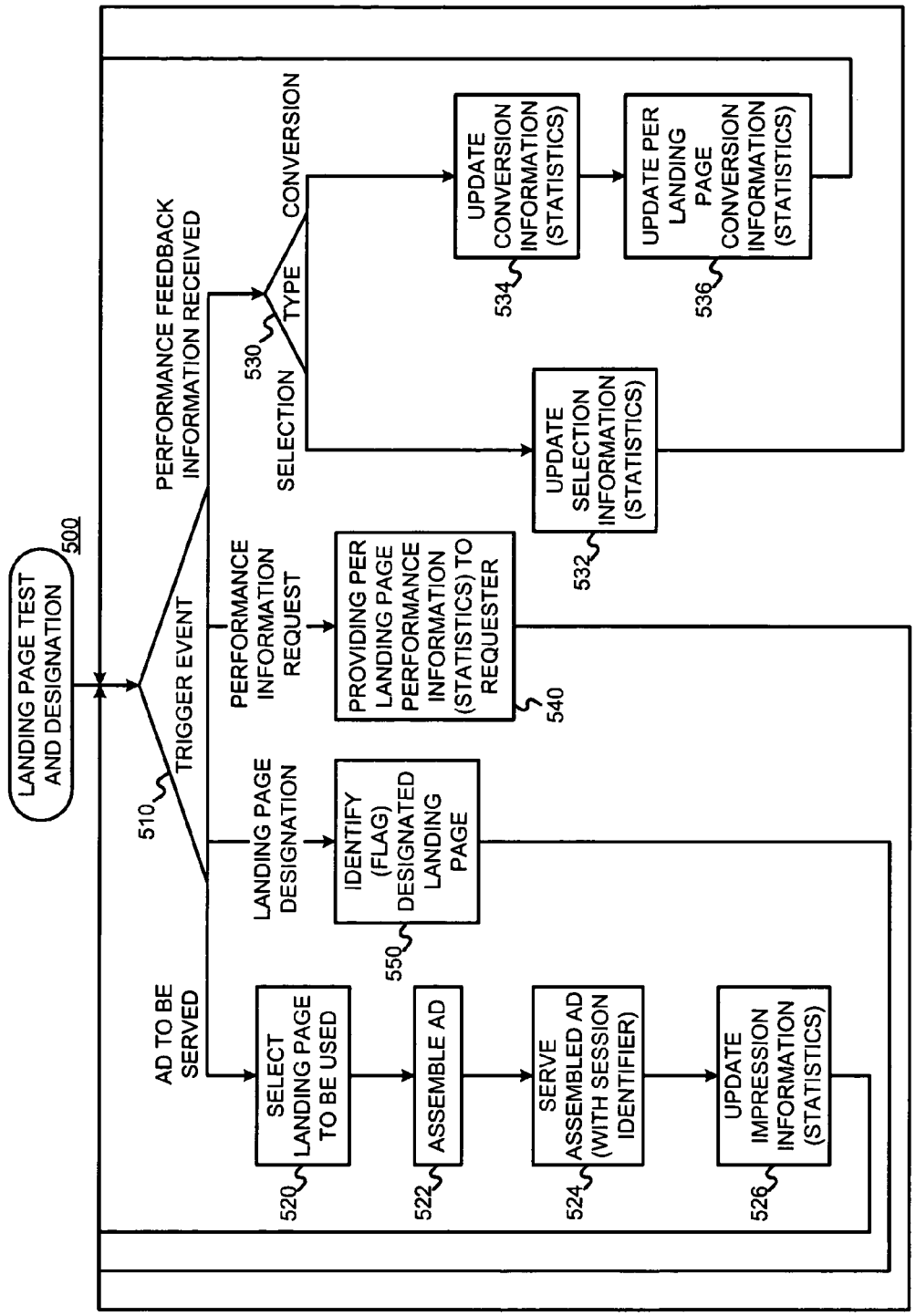
FIG. 5 is a flow diagram of an exemplary method that may be used to compare the performance of different landing pages in a manner consistent with the present invention.

FIG. 5 is a flow diagram of an exemplary method 500 that may be used to compare ad landing pages. As indicated by trigger event block 510, various branches of the exemplary method 500 may be performed in response to the occurrence of various conditions. For example, if an ad is to be served (and the ad has more than one landing page), the landing page to be used is selected. (Block 520) The ad is then assembled. (Block 522) For example, the assembled ad may include an ad creative and a link to the selected landing page. The assembled ad is then served. (Block 524) A session identifier may be stored and provided (e.g., encoded) in the ad to permit the performance of the ad to be tracked for example. Other means for tracking the performance of the served ad are possible. Finally "impression" information (e.g., statistics) of the ad is updated. (Block 526) For example, a count of the number of times the ad is served may be stored as an impression count. An impression count may be used for determining some performance statistics. The exemplary method 500 then branches back to trigger event block 510.

Referring once again to trigger event block 510, if performance feedback (e.g., of an ad) is received, the exemplary method 500 determines what type of performance information was received. (Block 530) If ad selection performance (e.g., click) information is received, selection information (e.g., statistics) of the ad is updated (Block 532) and the exemplary method 500 branches back to trigger event block 510. Referring back to block 530, if conversion performance information is received, conversion information (e.g., statistics regarding number of purchases, money value of purchases, earnings attributable to purchases, etc.) for the ad is updated (Block 534), per ad landing page conversion information (statistics) is updated (Block 536), and the exemplary method 500 branches back to trigger event block 510. Examples of per ad landing page conversion information include one or more of conversion rate, sales per ad selection, earnings per ad selection, etc. Although conversion rate may represent a ratio of conversions-to-impressions, it may also represent a ratio of conversions-to-selections.

Referring once again to trigger event block 510, if performance information, such as per ad landing page performance statistics for example, are requested (e.g., by an authorized application program, by an authorized advertiser user, by an authorized ad serving entity user, etc.), such information may be provided to the requester (Block 540) before the exemplary method 500 branches back to trigger event block 510.

Referring once again to trigger event block 510, if a particular ad landing page is designated (e.g., by an authorized application program, by an authorized advertiser user, by an authorized ad serving entity user, etc.) to be used in future serves of the ad, the designated landing page is identified (e.g., flagged) (Block 550) before the exemplary method 500 branches back to trigger event block 510.

Figure 6:
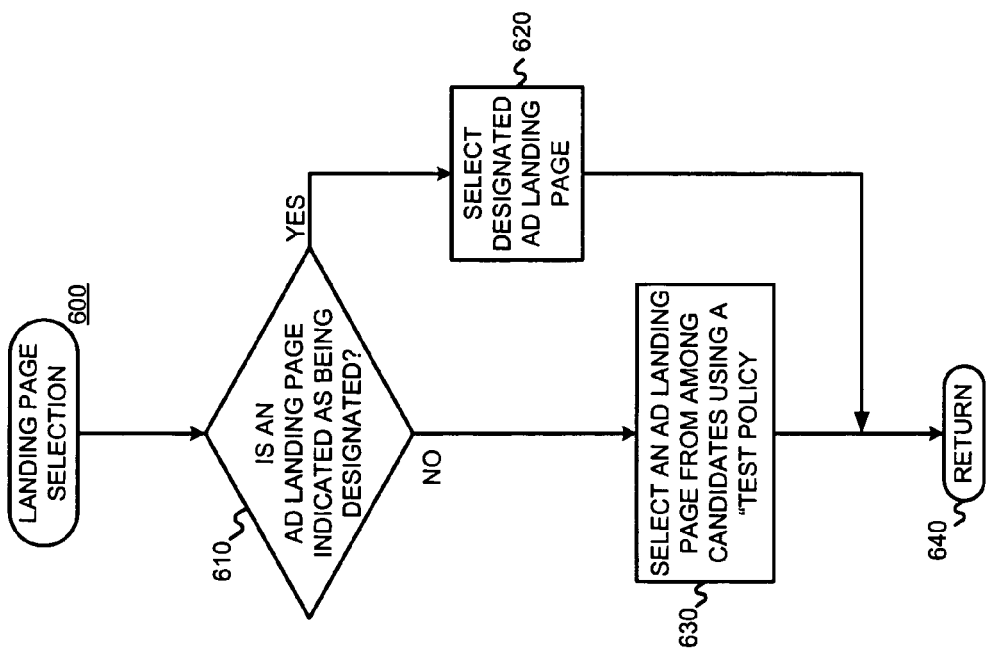
FIG. 6 is a flow diagram of an exemplary method that may be used to select one of a number of different ad landing pages in a manner consistent with the present invention.

Recall from block 520 that an ad landing page is selected (e.g., from among a number of candidate ad landing pages). FIG. 6 is a flow diagram of an exemplary method 600 that may be used to select an ad landing page. Whether or not one of the ad landing pages is indicated (e.g., flagged) as being designated (Recall, e.g., block 550 of FIG. 5.) is determined. If an ad landing page is indicated as being designated, the designated ad landing page is selected (Block 620) and the exemplary method 600 is left (Node 640). If, on the other hand, no ad landing page is indicated as being designated, an ad landing page is selected from among the candidates using a test policy (Block 630) and the exemplary method 600 is left (Node 640). One exemplary test policy that is consistent with the present invention is to select an ad landing page from among the candidate ad landing pages using a round robin selection discipline. Another exemplary test policy that is consistent with the present invention is to select an ad landing page from among the candidate ad landing pages using a random function, under which each of ad landing pages has a roughly equal likelihood of being selected. Other test policies for selecting an ad landing page from among the candidate ad landing pages are possible. For example, if a conversion rate representing a ratio of conversions-to-selections is desired, past user selections (e.g., clicks) of the various ad landing pages may be considered. In this way, ad landing pages with few or no user selections (and therefore little conversion rate information) may be favored over ad landing pages with a lot of user selections.

Figure 7:
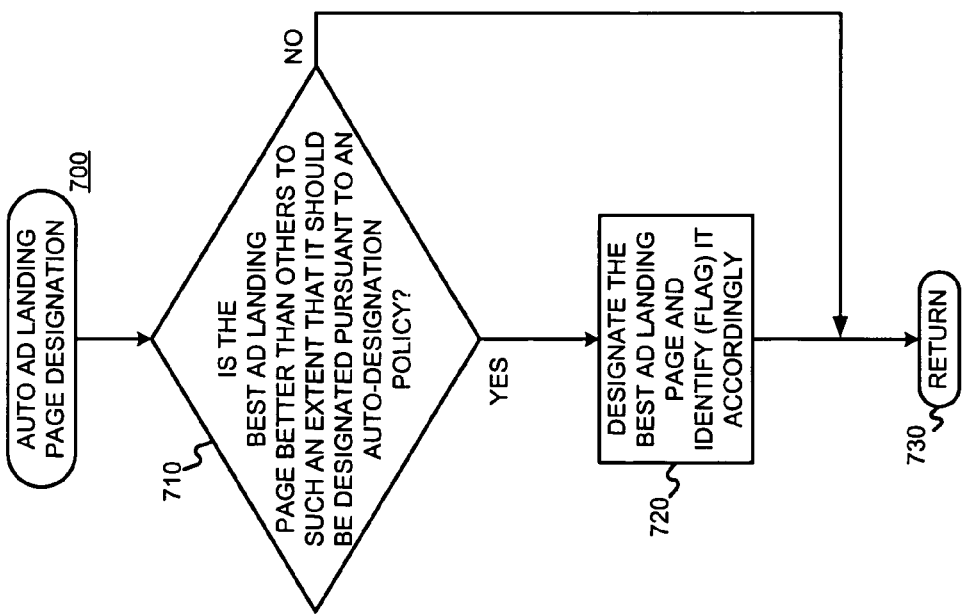
FIG. 7 is a flow diagram of an exemplary method that may be used to automatically designate one of a number of different ad landing pages in a manner consistent with the present invention.

Referring back to block 550, recall that a particular ad landing page may be designated, by an authorized application program, to be used in future serves of the ad. FIG. 7 is a flow diagram of an exemplary method 700 that may be used to automatically designate one of a number of different ad landing pages to be used in future serves of the ad, in a manner consistent with the present invention. The exemplary method 700 may be run periodically, or in response to some event such as the receipt of ad performance (e.g., conversion) information. As indicated by block 710, it is determined whether or not the best performing ad landing page is better than the others to such an extent that it should be designated under an auto-designation policy. If so, the "best" performing ad landing page is designated for use in future serves of the ad (Block 720) and the exemplary method 700 is left (Node 730). Otherwise, the exemplary method 700 is simply left (Node 730). Note that in alternative embodiments of the invention, more than one ad landing page may be designated.

Referring back to block 710, the auto-designation policy may consider a one or more of the following factors: (a) whether the performance information of each ad landing page is statistically significant; (b) a margin of error in the performance information of the ad landing pages; (c) an absolute difference in the performance information of the ad landing pages; (d) a relative difference in the performance information of the ad landing pages. Other factors may be considered as well.

Referring back to block 720, rather than identify the designated ad landing page, other candidate ad landing page(s) may simply be removed from further consideration (e.g., deleted).

§ 4.2.2 Exemplary Apparatus

Figure 8:
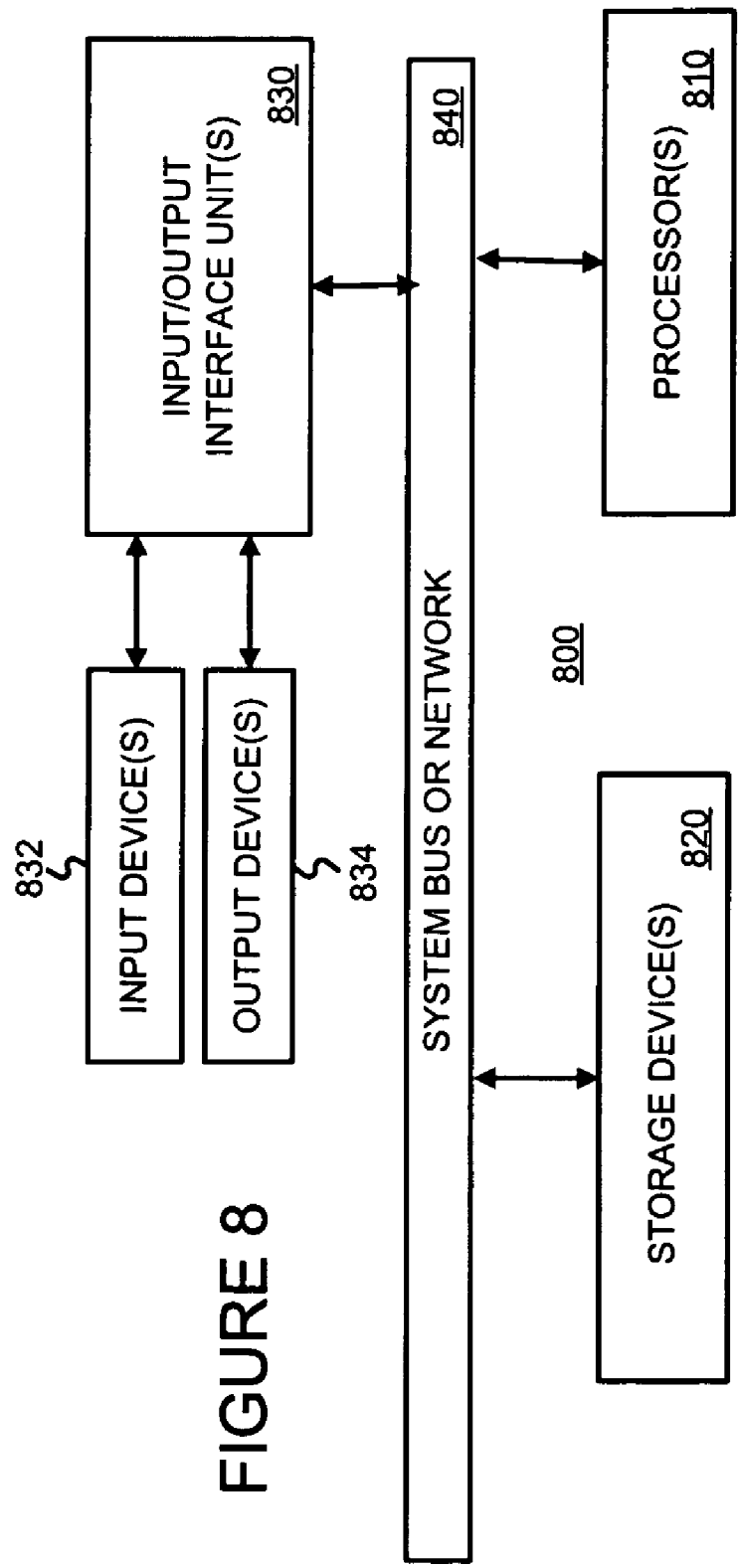
FIG. 8 is a block diagram of apparatus that may be used to perform at least some of the various operations that may be used, and store at least some of the information that may be used and/or generated, in a manner consistent with the present invention.

FIG. 8 is high-level block diagram of a machine 800 that may be used to perform one or more of the operations discussed above. The machine 800 basically includes one or more processors 810, one or more input/output interface units 830, one or more storage devices 820, and one or more system buses and/or networks 840 for facilitating the communication of information among the coupled elements. One or more input devices 832 and one or more output devices 834 may be coupled with the one or more input/output interfaces 830.

The one or more processors 810 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 820 and/or may be received from an external source via one or more input interface units 830.

In one embodiment, the machine 800 may be one or more conventional personal computers. In this case, the processing units 810 may be one or more microprocessors. The bus 840 may include a system bus. The storage devices 820 may include system memory, such as read only memory (ROM) and/or random access memory (RAM). The storage devices 820 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 832, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 810 through an appropriate interface 830 coupled to the system bus 840. The output devices 834 may include a monitor or other type of display device, which may also be connected to the system bus 840 via an appropriate interface. In addition to (or instead of) the monitor, the personal computer may include other (peripheral) output devices (not shown), such as speakers and printers for example.

The ad server 210, user device (client) 250, search engine 220, content server 230, and/or e-mail server 240 may be implemented as one or more machines 800.

§ 4.2.3 Refinements and Alternatives

Although the methods described in § 4.2.1 above are useful for comparing the performance of alternative ad landing pages and/or designating ad landing pages, many alternatives will be apparent to those skilled in the art. For example, performance (e.g., conversion rate) information for the ad landing pages may be normalized to remove the influence of other factors related to the ad serving or ad selection (e.g., local time of day of the ad serving and/or of the ad selection, local day of week of the ad serving and/or of the ad selection, geolocation of the user to whom the ad was served and/or who selected the ad), user type (e.g., user profile) of the user to whom the ad was served and/or who selected the ad), etc.

If different ad creatives are used for a given ad, the performance information for each ad landing page can be normalized to remove the influence of different ad creatives. Similarly, if different serving constraints (e.g., targeting keywords) are used to serve the ads, the performance information for each ad landing page can be normalized to remove the influence of different serving constraints.

Alternatively, rather than just testing (e.g., rotating through) various alternative ad landing pages, various combinations of {targeting keyword, landing page} pairs, {ad creative, landing page} pairs, or targeting keyword, ad creative, landing page} triples can be tested (e.g., rotated through) to permit the best combination to be discovered. Note that although this alternative of rotating through various combinations of serving constraint/creatives/landing pages to be able to discover the best combination may provide better overall results, it is more complicated and takes longer to gather statistically significant performance information than simply rotating through various alternative landing pages for a given ad creative and targeting information. For example, suppose there are three different serving constraints, ten different creatives, and six different landing pages. This would produce 180 (=3*10*6) different combinations to test. It might take too long to gather enough performance (e.g., conversion rate) information to draw any meaningful conclusions.

Note that both approaches could be used in concert. That is, the performance of serving constraints, ad creatives and landing pages could first be tested independently to reduce the number of candidate serving constraints/ad creatives/landing pages combinations to a more manageable number, thereby reducing the number of combinations thereof tested. Thus, for example, if the three different serving constraints were reduced to two, the ten different creatives were reduced to three, and six different landing pages were reduced to two during separate (independent) testing, the number of combinations to be tested during combination (dependent) testing would be reduced to 12 (=2*3*2) from 180.

Different ad landing pages can include one or more of the following differences: (a) different information; (b) different products or services offered for sale; (c) different product or service prices; (d) different formatting (e.g., different style templates); (e) different shipping charges. For example, first and second ad landing pages may offer the same products at the same prices, but one might include images of the products with a brief feature description, while the other might include detailed technical specifications but no images. As another example, first, second, third and fourth ad landing pages might offer the same products at the same prices with the same information, but the first might order products by popularity, while the second might order products by cost, the third might order products by average customer rating and the fourth might order products alphabetically, by manufacturer and product. Various other differences and combinations of differences are possible.

In at least one alternative embodiment of the present invention, the performance of an ad, such as its clickthrough rate and/or its conversion rate for example, may be improved by (i) providing or accepting different alternative sets of ad information (e.g., one or more different ad features and/or one or more different serving constraints used to target the serving of the ad) combinations for a given ad campaign, (ii) selecting different ones of the different alternative sets ad information combinations, and (iii) tracking the performance of the different alternative sets of ad information combinations. In this way, both an ad serving entity and advertisers can determine which of a number of the different ad information combinations performs best (in general, or in a particular context). Using the performance of the different ad information combinations, the advertiser or ad serving entity can manually or automatically designate one (or more) of the ad information combinations to be used in the future.

In at least one embodiment of the present invention, each of the different alternative sets of ad information combination has at least one piece of ad information that differs from that in the other sets. For example, ad information may include ad features such as a message (e.g., "best prices on digital cameras", or "free shipping on digital cameras") and font style (e.g., black Courier 8 pt., or blue Arial 8 pt.) A first ad information combination may be {message 1, font style 1}, a second ad information combination may be {message 1, font style 2}, a third ad information combination may be {message 2, font style 1}, and a fourth ad information combination may be {message 2, font style 2}.

In at least one embodiment of the present invention, rather than changing a serving constraint in various different alternative sets of ad information combinations, the conditions under which the ad was triggered and/or served may be tracked.

Different sets of ad information can include one or more of the following differences: (a) different creatives (e.g., different text (such as rendered link), images, audio, video, formats (such as color, font styles or sizes, etc.); and/or (b) different serving constraints (e.g., different targeting keywords, concepts, topics, user geolocation, user local time, etc.)

If certain ad landing page differences are common across a number of different ads or advertisers, the performance of such different landing pages may be tracked across an aggregated set of ads. For example, if it is desired to determine whether one of a number of pre-defined ad landing page formatting style templates works best, the performance of the different ad landing page formatting style templates may be tracked per ad, as well as across a number of ads. Similarly, if certain ad information combination differences are common across a number of different ads or advertisers, the performance of such different sets of ad information combinations may be tracked across an aggregated set of ads.

§ 4.3 CONCLUSIONS

As can be appreciated from the foregoing disclosure, the present invention can be used to compare and evaluate the performance of different ad landing pages. This advantageously permits advertisers and ad serving entities to determine which of a number of candidate ad landing pages best suits their needs (e.g., performs best). One (or more) of the ad landing pages may be manually or automatically designated for use with future serves of the ad. Similarly, different sets of ad information combinations can be evaluated.

What is claimed is:

1. A computer-implemented method for facilitating the comparison of different ad landing pages associated with an advertiser, the computer-implemented method comprising:
   a) for an ad to be served, automatically selecting, using a computer system including at least one processor and at least one storage device, one of a plurality of candidate ad landing pages associated with the advertiser;
   b) automatically assembling, using the computer system, the ad to include a link to the selected ad landing page;
   c) serving, using the computer system, the assembled ad; and
   d) tracking, using the computer system, a performance of the ad in combination with the automatically selected ad landing page, such that, for the ad, a performance for each of the plurality of candidate landing pages, linked from the ad when serving the ad, is separately tracked, wherein the performance of the ad in combination with the automatically selected ad landing page tracked is at least one of conversion per impression performance, conversion per selection performance, sales per ad selection, sales per ad impression, earnings per ad selection, and earnings per ad impression.

2. The computer-implemented method of claim 1 wherein the act of automatically selecting one of a plurality of candidate ad landing pages is performed in a round-robin manner.

3. The computer-implemented method of claim 1 wherein the act of automatically selecting one of a plurality of candidate ad landing pages is performed using a random selection function.

4. The computer-implemented method of claim 1 further comprising:
  e) determining, using the computer system, whether or not to automatically designate one of the plurality of candidate ad landing pages using a comparison of their respective performance and an auto-designation policy; and
  f) automatically designating, using the computer system, the one of the plurality of candidate ad landing pages if it was determined to designate it.

5. The computer-implemented method of claim 4 wherein the performance of the ad in combination with the automatically selected ad landing page tracked is at least one of conversion per impression performance, conversion per selection performance, sales per ad selection, sales per ad impression, earnings per ad selection, and earnings per ad impression.

6. The computer-implemented method of claim 1 further comprising:
  e) accepting, using the computer system, a request for performance information of the ad; and
  f) providing, using the computer system, the performance information of the ad for each of the plurality of candidate ad landing pages with which the ad was served to the requester.

7. The computer-implemented method of claim 6 wherein the performance information of the ad provided for each of the plurality of candidate ad landing pages with which the ad was served, is at least one of conversion per impression performance, conversion per selection performance, sales per ad selection, sales per ad impression, earnings per ad selection, and earnings per ad impression.

8. The computer-implemented method of claim 6 further comprising:
  g) accepting, using the computer system, a manual ad landing page designation instruction; and
  h) designating, using the computer system, one of the plurality of candidate ad landing pages using the manual ad landing page designation instruction.

9. The computer-implemented method of claim 8 wherein the performance of the ad in combination with the automatically selected ad landing page tracked is at least one of conversion per impression performance, conversion per selection performance, sales per ad selection, sales per ad impression, earnings per ad selection, and earnings per ad impression.

10. The computer-implemented method of claim 1 further comprising:
  e) normalizing, using the computer system, the performance of the ad in combination with the automatically selected ad landing page to remove ad landing page independent factors that may influence the ad performance.

11. The computer-implemented method of claim 1 wherein the plurality of candidate ad landing pages are different in at least one of the following (A) different information, (B) different products offered for sale, (C) different services offered for sale, (D) different product prices, (E) different service prices, (F) different formatting, and (G) different shipping charges.

12. A computer-implemented method for facilitating the comparison of different {ad landing page, ad creative} combinations associated with an advertiser, the computer-implemented method comprising:
  a) for an ad to be served, automatically selecting, using a computer system including at least one processor and at least one storage device, one of a plurality of candidate {ad landing page, ad creative} combinations, at least some of the combinations including different ad landing pages associated with the advertiser;
  b) automatically assembling, using the computer system, the ad to include the selected ad creative and the selected ad landing page of the selected {ad landing page, ad creative} combination;
  c) serving, using the computer system, the assembled ad; and
  d) tracking, using the computer system, a performance of the ad in combination with the automatically selected {ad landing page, ad creative} combinations, such that, for the ad, a performance for each of the plurality of {ad landing page, ad creative} combinations, used when serving the ad, is separately tracked,
  wherein the performance of the ad in combination with the automatically selected {ad landing page, ad creative} combinations tracked is at least one of conversion performance, sales per ad selection, sales per ad impression, earnings per ad selection, and earnings per ad impression.

13. The computer-implemented method of claim 12 wherein the plurality of candidate ad landing pages are different in at least one of the following (A) different information, (B) different products offered for sale, (C) different services offered for sale, (D) different product prices, (E) different service prices, (F) different formatting, and (G) different shipping charges.

14. A computer-implemented method for comparing facilitating the comparison of different {ad landing page, ad serving criteria} combinations associated with an advertiser, the computer-implemented method comprising:
  a) for an ad to be served, automatically selecting, using a computer system including at least one processor and at least one storage device, one of a plurality of candidate {ad landing page, ad serving criteria} combinations, at least some of the combinations including different ad landing pages associated with the advertiser;
  b) automatically assembling, using the computer system, the ad to include the selected ad landing page of the selected {ad landing page, ad serving criteria} combination;
  c) serving, using the computer system, the assembled ad; and
  d) tracking, using the computer system, a performance of the ad in combination with the automatically selected {ad landing page, ad serving criteria} combination, such that, for the ad, a performance for each of the plurality of {ad landing page, ad serving criteria} combinations, used when serving the ad, is separately tracked,
  wherein the performance of the ad in combination with the automatically selected {ad landing page, ad serving criteria} combination tracked is at least one of conversion performance, sales per ad selection, sales per ad impression, earnings per ad selection, and earnings per ad impression.

15. The computer-implemented method of claim 14 wherein the plurality of candidate ad landing pages are different in at least one of the following (A) different information, (B) different products offered for sale, (C) different services offered for sale, (D) different product prices, (E) different service prices, (F) different formatting, and (G) different shipping charges.

16. A computer-implemented method for facilitating the comparison of different types of ad landing pages associated with an adviser, the computer-implemented method comprising:
   a) for an ad to be served, automatically selecting, using a computer system including at least one processor and at least one storage device, one of a plurality of candidate ad landing pages associated with the advertiser, wherein each of the plurality of candidate ad landing pages has a different types;
   b) automatically assembling, using the computer system, the ad to include the selected ad landing page;
   c) serving, using the computer system, the assembled ad; and
   d) tracking, using the computer system, a performance of a set of ads in combination with the type of automatically selected ad landing page, such that, for the ad, a performance for each of the plurality of types of landing page, used when serving the ad, is separately tracked,
   wherein the performance of the set of ads in combination with the type of automatically selected ad landing page tracked is at least one of conversion per impression performance, conversion per selection performance, sales per ad selection, sales per ad impression, earnings per ad selection, and earnings per ad impression.

17. The computer-implemented method of claim 16 wherein the different types of ad landing pages have different formatting styles.

18. Apparatus for facilitating the comparison of different ad landing pages associated with an advertiser, the apparatus comprising:
   at least one processor;
   at least one input/output interface unit; and
   at least one storage device, the storage device storing program instructions which, when executed by the at least one processor, perform a method including:
   a) automatically selecting one of a plurality of candidate ad landing pages associated with the advertiser for an ad to be served;
   b) automatically assembling the ad to include a link to the selected ad landing page;
   c) serving the assembled ad; and
   d) tracking a performance of the ad in combination with the automatically selected ad landing page, such that, for the ad, a performance for each of the plurality of candidate landing pages, linked from the ad when serving the ad, is separately tracked,
   wherein the performance of the ad in combination with the automatically selected ad landing page tracked is at least one of conversion per impression performance, conversion per selection performance, sales per ad selection, sales per ad impression, earnings per ad selection, and earnings per ad impression.

19. The apparatus of claim 18 wherein the act of automatically selecting one of a plurality of candidate ad landing pages performs the selection in a round-robin manner.

20. The apparatus of claim 18 wherein the act of automatically selecting one of a plurality of candidate ad landing pages performs the selection using a random selection function.

21. The apparatus of claim 18 wherein the performance of the ad in combination with the automatically selected ad landing page tracked is at least one of conversion per impression performance, conversion per selection performance, sales per ad selection, sales per ad impression, earnings per ad selection, and earnings per ad impression.

22. The apparatus of claim 18, wherein the program instructions, which, when executed by the at least one processor, perform the method further including:
   e) determining whether or not to automatically designate one of the plurality of candidate ad landing pages using a comparison of their respective performance and an auto-designation policy; and
   f) automatically designating the one of the plurality of candidate ad landing pages if it was determined to designate it.

23. The apparatus of claim 22 wherein the performance of the ad in combination with the automatically selected ad landing page tracked is at least one of conversion per impression performance, conversion per selection performance, sales per ad selection, sales per ad impression, earnings per ad selection, and earnings per ad impression.

24. The apparatus of claim 18, wherein the program instructions, which, when executed by the at least one processor, perform the method further including:
   e) accepting a request for performance information of the ad; and
   f) providing the performance information of the ad for each of the plurality of candidate ad landing pages with which the ad was served to the requester.

25. The apparatus of claim 24 wherein the performance information of the ad provided for each of the plurality of candidate ad landing pages with which the ad was served, is at least one of conversion per impression performance, conversion per selection performance, sales per ad selection, sales per ad impression, earnings per ad selection, and earnings per ad impression.

26. The apparatus of claim 24, wherein the program instructions, which, when executed by the at least one processor, perform the method further including:
   g) accepting a manual ad landing page designation instruction; and
   h) designating one of the plurality of candidate ad landing pages using the manual ad landing page designation instruction.

27. The apparatus of claim 26 wherein the performance of the ad in combination with the automatically selected ad landing page tracked is at least one of conversion per impression performance, conversion per selection performance, sales per ad selection, sales per ad impression, earnings per ad selection, and earnings per ad impression.

28. The apparatus of claim 18, wherein the program instructions, which, when executed by the at least one processor, perform the method further including:
   e) normalizing the performance of the ad in combination with the automatically selected ad landing page to remove ad landing page independent factors that may influence the ad performance.

29. The apparatus of claim 18 wherein the plurality of candidate ad landing pages are different in at least one of the following (A) different information, (B) different products offered for sale, (C) different services offered for sale, (D) different product prices, (E) different service prices, (F) different formatting, and (G) different shipping charges.

30. Apparatus for facilitating the comparison of different {ad landing page, ad creative} combinations associated with an advertiser, the apparatus comprising:

at least one processor;
at least one input/output interface unit; and
at least one storage device, the storage device storing program instructions which, when executed by the at least one processor, perform a method including:
a) automatically selecting one of a plurality of candidate {ad landing page, ad creative} combinations for an ad to be served, at least some of the combinations including different ad landing pages associated with the advertiser;
b) automatically assembling the ad to include the selected ad creative and the selected ad landing page of the selected {ad landing page, ad creative} combination;
c) serving the assembled ad; and
d) tracking a performance of the ad in combination with the automatically selected {ad landing page, ad creative} combinations, such that, for the ad, a performance for each of the plurality of {ad landing page, ad creative} combinations, used when serving the ad, is separately tracked,
wherein the performance of the ad in combination with the automatically selected {ad landing page, ad creative} combinations tracked is at least one of conversion performance, sales per ad selection, sales per ad impression, and earnings per ad impression.

31. The apparatus of claim 30 wherein the plurality of candidate ad landing pages are different in at least one of the following (A) different information, (B) different products offered for sale, (C) different services offered for sale, (D) different product prices, (E) different service prices, (F) different formatting, and (G) different shipping charges.

32. Apparatus for facilitating the comparison of different {ad landing page, ad serving criteria} combinations associated with an advertiser, the apparatus comprising:
at least one processor;
at least one input/output interface unit; and
at least one storage device, the storage device storing program instructions which, when executed by the at least one processor, perform a method including:
a) automatically selecting one of a plurality of candidate {ad landing page, ad serving criteria} combinations for an ad to be served, at least some of the combinations including different ad landing pages associated with the advertiser;
b) automatically assembling the ad to include the selected ad landing page of the selected {ad landing page, ad serving criteria} combination;
c) serving the assembled ad; and
d) tracking a performance of the ad in combination with the automatically selected {ad landing page, ad serving criteria} combination, such that, for the ad, a performance for each of the plurality of {ad landing page, ad serving criteria} combinations, used when serving the ad, is separately tracked,
wherein the performance of the ad in combination with the automatically selected {ad landing page, ad serving criteria} combinations tracked is at least one of conversion performance, sales per ad selection, sales per ad impression, earnings per ad selection, and earnings per ad impression.

33. The apparatus of claim 32 wherein the plurality of candidate ad landing pages are different in at least one of the following (A) different information, (B) different products offered for sale, (C) different services offered for sale, (D) different product prices, (E) different service prices, (F) different formatting, and (G) different shipping charges.

34. Apparatus for facilitating the comparison of different types of ad landing pages associated with an advertiser, the apparatus comprising:
at least one processor;
at least one input/output interface unit; and
at least one storage device, the storage device storing program instructions which, when executed by the at least one processor, perform a method including:
a) automatically selecting one of a plurality of candidate ad landing pages associated with the advertiser, wherein each of the plurality of candidate ad landing pages has a different type, for an ad to be served;
b) automatically assembling the ad to include the selected ad landing page;
c) serving the assembled ad; and
d) tracking a performance of a set of ads in combination with the type of the automatically selected ad landing page, such that, for the ad, a performance for each of the plurality of types of landing pages, used when serving the ad, is separately tracked,
wherein the performance of the set of ads in combination with the type of the automatically selected ad landing page tracked is at least one of conversion performance, sales per ad selection, sales per ad impression, earnings per ad selection, and earnings per ad impression.

35. The apparatus of claim 34 wherein the different types of ad landing pages have different formatting styles.

36. A computer-implemented method for facilitating the comparison of at least two different ad landing pages associated with an advertiser, the computer-implemented method comprising:
a) for an ad to be served at a first time
i) automatically selecting, using a computer system including at least one processor and at least one storage device, a first ad landing page from a plurality of candidate ad landing pages associate with the advertiser, and
ii) serving an instance of the ad with a link to the first ad landing page;
b) for the ad to be served a second time
i) automatically selecting, using the computer system, a second ad landing page, different from the previously selected first ad landing page, from the plurality of candidate ad landing pages associated with the advertiser, and
ii) serving, using the computer system, an instance of the ad with a link to the second ad landing page;
c) tracking, using the computer system, the performance of instances of the ad having a link to the first ad landing page; and
d) tracking, using the computer system, the performance of instances of the ad having a link to the second ad landing page,
wherein the performance of the ad in combination with the automatically selected first and second ad landing pages tracked is at least one of conversion per impression performance, conversion per selection performance, sales per ad selection, sales per ad impression, earnings per ad selection, and earnings per ad impression.

37. Apparatus for facilitating the comparison of at least two different ad landing pages associated with an advertiser, the apparatus comprising:
at least one processor;
at least one input/output interface unit; and
at least one storage device, the storage device storing program instructions which, when executed by the at least one processor, perform a method including:

a) automatically selecting
   i) for an ad to be served at a first time, a first ad landing page from a plurality of candidate ad landing pages associated with the advertiser, and
   ii) for the ad to be served a second time, a second ad landing page, different from the previously selected first ad landing page, from the plurality of candidate ad landing pages associated with the advertiser;
b) serving
   i) an instance of the ad with a link to the first ad landing page, and
   ii) an instance of the ad with a link to the second ad landing page; and
c) separately tracking the performance of
   i) instances of the ad having a link to the first ad landing page, and
   ii) instances of the ad having a link to the second ad landing page,
wherein the performance of the ad in combination with the automatically selected first and second ad landing pages tracked is at least one of conversion per impression performance, conversion per selection performance, sales per ad selection, sales per ad impression, earnings per ad selection, and earnings per ad impression.

* * * * *